March 7, 1961 J. I. BELLAMY 2,974,199

TELEPHONE PAYSTATION CIRCUIT WITH COIN-ACCEPT CONTROL

Filed Aug. 22, 1955

United States Patent Office 2,974,199

Patented Mar. 7, 1961

2,974,199

TELEPHONE PAYSTATION CIRCUIT WITH COIN-ACCEPT CONTROL

John I. Bellamy, Wheaton, Ill., assignor to International Telephone and Telegraph Corporation, New York, N.Y., a corporation of Maryland Filed Aug. 22, 1955, Ser. No. 529,755

3 Claims. (Cl. 179—6.3)

This invention relates to a telephone paystation circuit with coin-accept control, and its principal object is to provide a new and improved circuit arrangement for a telephone paystation which will permit a simpler and more reliable control to be exercised over the acceptance thereat of a coin of a denomination smaller than the minimum charge for a local call.

This invention has its greatest present use in a prepayment paystation, being one at which payment at least equal to the charge for a local call must be made, by coin deposit, before a local call is permitted. The prepayment deposit is held temporarily, within a coin-abeyance chamber controlled by a polarized collect-refund magnet, for collection if a local call is completed, and for refund if the local call is not completed. Extended, or toll, calls from a paystation are completed through the assistance of a toll operator, who directs the caller to deposit a coin or coins of a value equal to the charge for the call. Because of the varying rates charged for calls, it has lately become a practical necessity in many localities for a paystation to include, among its gauged coin chutes, at least one small-value chute gauged to receive a coin of a smaller denomination than the charge for a local call. In that case, the coin-chute mechanism is so arranged that a coin deposited in a small-value chute is not normally accepted. Such a paystation, however, commonly contains a coin-accept magnet which, when energized, causes the coin-chute mechanism to accept small-value coins, as for change-making purposes, when a toll call is being paid for under operator supervision.

A specific object of the invention is to provide a new and improved circuit arrangement for so controlling the noted coin-accept magnet that it is energized as required when payment is to be made for a toll call, while insuring that it is not operated incident to the initiation of a local call before the minimum local-call fee has been effectively deposited.

In one prior proposal, the coin-accept magnet has been connected between one line conductor and ground and arranged not to operate until a toll operator temporarily applies a relatively high voltage to the calling line, as when collecting or refunding deposited coins. This proposal is not entirely satisfactory, in that it presents added marginal problems which are only partially overcome by the addition of a rare-gas cold-cathode tube.

A second prior proposal comprises (1) placing the winding of the coin-accept magnet in the direct-current loop of the paystation line for operation at any time when normal loop current is flowing therein, and (2) employing a so-called ground-start arrangement to withhold loop current from a calling paystation line until the flow of current over a ground-return path indicates that the minimum fee for a local call has been effectively deposited to cause the collect-refund magnet to become connected in its ground-return circuit path by contact mechanism controlled by the usual coin-detect lever. This second prior proposal is open to the two objections that (1) the caller is required to deposit a local-call fee before being assured, as by dial tone, that the line and switchboard apparatus are in working order, failing which the deposited fee is not returned, and (2) the grounded-line calling condition can be readily simulated by a fraudulent caller to cause loop current to appear without coin deposit, as by temporarily connecting a grounded wire to one line conductor. The fraudulent caller thus obtains a local connection without any coin deposit, or does so by the subsequent deposit of a small-value coin if the switchboard circuit arrangements contain certain known ground-resistance test features.

According to the invention, the foregoing drawbacks of the prior proposals are overcome by providing an operating circuit for the coin-accept magnet which is controlled locally and directly by the contact mechanism actuated by the coin-detect lever. In carrying out the invention, I prefer to have this contact mechanism insert the winding of the coin-accept magnet in series with the substation loop, as by opening a normally closed by-pass path.

The above-mentioned and other features and objects of this invention and the manner of attaining them will become more apparent, and the invention itself will be best understood, by reference to the following description of an embodiment of the invention taken in conjuction with the accompanying drawings comprising Figs. 1 to 4, wherein.

Figures 1, 2, 3, 4:
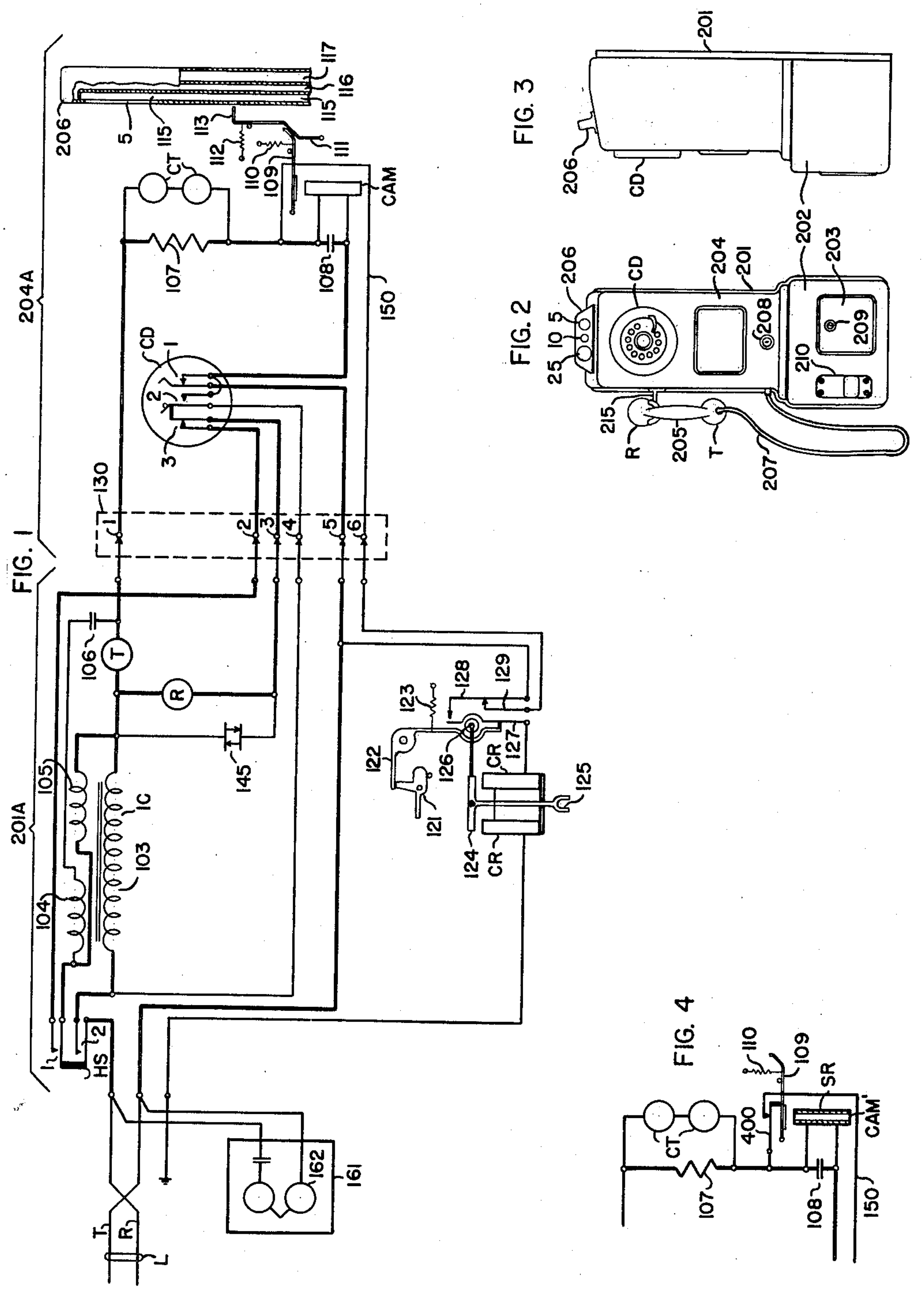
Fig. 1 is a schematic circuit diagram, and a fragmentary mechanical illustration, of a prepay automatic paystation embodying the invention.
Figs. 2 and 3 are external views of the usual form of an automatic paystation to which the circuit of Fig. 1 may be applied.
Fig. 4 shows a desirable modification of the circuit of Fig. 1.

It has been chosen to illustrate that invention as applied to a paystation designed for United States coins, and to describe the operation thereof with specific reference to conventional United States telephone practices, but it will be understood that the invention is readily applicable to paystations arranged for the coins and telephone practices of other countries.

Referring now to the drawings, the paystation mechanism contemplated therein may follow the disclosure in one or more of the following United States patents:

(1) Forsberg, 1,043,219, Coin Collector.

(2) Bennett, 1,863,322, Telephone Paystation.

(3) Hoyt et al., 2,179,091, Coin Collector.

(4) Dewar, 2,642,496, Telephone Paystation.

Referring first to Figs. 2 and 3, showing front and right-side views, the illustrated paystation is of the current handset automatic type. It includes a back plate 201 on which is fixedly mounted the lower housing 202, which provides a coin-return opening 210, and a cash-box door 203 controlled by lock 209. Upper front housing 204 is removably secured to the back plate 201 and housing 202 under control of lock 208, and has the coin-chute mechanism 206 mounted therein, which includes gauged openings 25, 10, and 5 for United States coins termed quarters, dimes, and nickels, respectively. The calling device CD, mounted in the housing 204, is left unused or is replaced by a blank when the structure is to serve as a manual paystation. Handset 205, connected to terminals on the base-plate by the usual 3-conductor cord 207, contains the receiver R and transmitter T of Fig. 1, and normally hangs on switch hook 215, which is supported on the base plate 201 to control the hookswitch HS of Fig. 1 in the usual manner.

Referring to Fig. 1, the paystation circuit shown therein is for use in the paystation of Figs. 2 and 3 when installed where the local-call charge is ten cents, with the coin-chute mechanism 206 and 115 so arranged that it will not normally accept a deposited nickel.

The 10-cent paystation of Fig. 1 is served by conductors T and R of the usual two-conductor lines L, which may extend to conventional switchboard apparatus. A ringer 162 and associated condenser are indicated as mounted in a separate ringer box 161, as the paystation apparatus of Figs. 2 and 3 does not usually contain a ringer.

The circuit apparatus bracketed at 201A is fixed with the base plate 201 of Figs. 2 and 3, while the apparatus bracketed at 204A is mounted in the removable front portion 204 of Figs. 2 and 3. The conductors interconnecting portions 201A and 204A are carried through the detachable contacts 1 to 6 indicated within the broken-line rectangle 130.

Apparatus 201A includes the hookswitch HS, the induction coil IC, transmitter T and receiver R of handset 205, Fig. 2, condenser 106, and the collect-refund magnet CR, with its associated apparatus which includes the coin-detect levers 121 and 122, and the contact members 127 to 129 controlled thereby.

Upper-front-housing apparatus 204A of Fig. 1 includes the calling device CD, two coin transmitters CT and associated shunting resistor 107, the coin-accept magnet CAM, and the coin-chute mechanism 206 of Figs. 2 and 3.

As indicated at the right in Fig. 1 the coin slot mechanism 206 includes three parallel chutes 115 to 117, for nickels, dimes, and quarters respectively. Those chutes have respective gauged entrance openings 5, 10, and 25 (Fig. 2), and discharge in common through the usual hopper (not shown) leading to the usual coin-abeyance chamber (also not shown), controlled by armature 124 of collect-refund magnet CR, with the passage of any coin into this chamber causing the tripping movement of coin-detect lever 121 from its normal illustrated position.

Armature 109 of coin-accept magnet CAM is normally held against a stop member by spring 110. When actuated, it moves lever 111 in a clockwise direction against the tension of spring 112. Tip 113 of lever 111 is thereby brought into a new association with the nickel chute 115, thereby adapting the nickel chute to accept a five-cent coin deposited therein through opening 5. The precise result of the movement at 113 depends upon the type of mechanism employed to preclude a ten-cent local call from being made upon the deposit of no more than a single five-cent coin.

In one example, the paystation may be arranged to accept either two nickels or a dime in pre-payment for a ten-cent local call. If so, the coin-chute mechanism may be similar to that of the Hoyt et al. patent, with the one-cent chute eliminated therefrom. Then, the five-cent chute 115 is so arranged that, unless CAM is energized, a first nickel deposited is retained therein in a nickel trap (not shown) until the deposit of a second nickel has occurred, whereupon the trap is momentarily opened, and both nickels pass through the chute. In this example, coin-accept magnet CAM, on energizing performs the function of magnet 43 in the Hoyt et al. patent to disable the nickel trap, thereby permitting any single nickel thereafter deposited to pass freely through chute 115.

In another example, the coin-chute arrangement of the Dewar patent may be used. Then any nickel deposited in chute 115 with CAM not energized in diverted from its normal path and caused to enter the return opening 210, Fig. 2. In this example magnet CAM performs the function of magnet 19 of the Dewar patent to nullify the nickel-diverting mechanism, thereby permitting any nickel thereafter deposited to pass freely through chute 115.

*Ground-start operation*

With the apparatus of Figs. 1 to 3 in its normal illustrated position, the raising of the handset 205 of Fig. 2 permits switch hook 215 to rise, thereby closing contacts 1 and 2 of the hookswitch HS shown in Fig. 1. A direct-current loop is thereby established from ring conductor R of the line L, through contacts 2 of the hookswitch HS, line winding 103 of induction coil IC, transmitter T of the handset, contact point 1 of group 130, the coin transmitters CT and their shunt resistor 107, coin-accept magnet CAM, impulse contacts 1 of the calling device CD, and contacts 5 of group 130, to the tip conductor T of line L. Contacts 1 of the calling device CD and the winding of magnet CAM are both normally being shunted by the shunt path over conductor 150, contacts 6 of group 130, and the normally closed contact springs 128 and 129. With this shunt path closed, the calling device is not effective to open the loop, nor can the coin-accept magnet CAM become energized. This shunt path remains closed until contacts 128 and 129 are separated by the effective deposit of a coin or coins of a value at least equal to the local call fee.

When the invention is applied to a pre-payment annual paystation, the calling device CD is not required. In that event, the only purpose of contact member 129 is to cooperate with contact member 128 in maintaining the winding of magnet CAM shunted until the required ten-cent local-call fee has been deposited.

If the ground-start arrangement heretofore referred to is employed at the exchange, the two conductors of line L may both extend normally to the ungrounded pole of the exchange battery, through the winding of the usual line relay, wherefore no direct-current flow occurs in the described loop circuit as a result of the removal of the handset. The caller is now expected to deposit at least the minimum ten-cent fee to cause contacts 127 to 129 to be operated by responsive action of levers 122 and 123, as hereinafter described more fully for loop-start operation, whereupon starting ground through the winding of CR, and springs 127 and 129, is applied to line conductor T, to thereby cause line-relay action to signal the conventional extension of the line to a circuit which supplies direct current in the line loop. With the coin-controlled separation of contacts 128 and 129 having occurred to open the shunt path over conductor 150, coin-accept magnet CAM is now effectively energized over the traced loop, and contacts 1 of CD become effective. From this point the call may proceed as hereinafter described for loop-start operation.

With ground-start operation, simulation of the connection of ground to the line L at the substation through the winding of CR, is sometimes attempted by a fraudulent caller, who may employ a length of wire to connect ground temporarily to one or another of the line conductors after removal of the handset, thus causing the usual ground-start extension of the line L, as a calling line, to occur. If such a fraudulent attempt is made with the disclosed substation circuit, coin accept magnet CAM still remains shunted at contacts 128 and 129, wherefore deposit of the prescribed ten-cent fee in the usual manner is still required to secure operation of the contact members 127 to 129, failing which the coin-accept magnet CAM cannot be operated to accept a nickel.

In the disclosed paystation, operation of contacts 127 to 129 is required before the connection is extended because (1) the conventional ground-start manual telephone exchange includes selective ground-detect apparatus which notifies the operator as to whether or not the extended calling line is grounded normally (through the winding of magnet CR) responsive to coin deposit, and because, (2) the conventional automatic telephone exchange may contain similar coin-detect apparatus to control response of the automatic switching apparatus, besides which the automatic switch apparatus cannot ordinarily be operated properly except in response to series of interruptions produced effectively at impulse contacts 1 of the calling device CD, and such interruptions cannot be effectively produced as long as the shunt path remains closed over conductor 150 and through contacts 128 and 129.

*Loop-start operation*

When the disclosed paystation arrangement is used for the conventional loop-start system, the described closure of contacts 2 of hookswitch HS to close the traced direct-current loop through the station apparatus causes the usual flow of current to occur over the conductors of line L, in series with the traced substation loop, to signal a call in the conventional manner at the exchange switchboard.

If the exchange switchboard is of a common manual type, the operator plugs a cord into the calling paystation line, but does not ordinarily answer until cord-associated ground-detect apparatus shows a fee deposit, or she may answer and request deposit of the necessary fee before completing the connection. On the other hand, if a conventional automatic switchboard is used, closure of the described loop circuit causes the automatic switching apparatus to be prepared for operation, whereupon a dial-tone signal is returned over the line L. This signal, on passing through the line winding 103 of induction coil IC, is induced in the circuit of the receiver R by receiver winding 105, in a circuit path which includes contacts 1 of hookswitch HS, and normally closed off-normal contacts 3 of the calling device CD.

Winding 104 of induction coil IC and condenser 106 comprise a known sidetone-reduction arrangement which is employed in one form or another in most handset telephones, and item 145 is the usual double-diode varistor for limiting high output at receiver R.

Using automatic operation as an example, when the caller hears the returned dial-tone signal in the receiver R, he is expected to deposit an amount at least equal to the required local-call fee, here assumed to be ten cents. If a dime is deposited in gauged opening 10 of Fig. 2, it passes down chute 116 of Fig. 1 to reach the coin-abeyance chamber (not shown), striking the 5-cent gong (not shown) twice to place a corresponding audible signal on the line through one of the coin-tone transmitters CT. If the caller has no coin less than a quarter, that coin may be deposited in the slot 25 of Fig. 2, to pass down chute 117 to the same effect except that it strikes the 25-cent gong (not shown).

If the arrangement of the Dewar patent previously referred to is employed at the coin chute mechanism, all five-cent coins deposited to initiate a call are returned, through refund opening 210 rather than being effectively received in the coin-abeyance chamber. On the other hand, if the previously described arrangement of Hoyt et al. is used, the caller may deposit the ten-cent prepayment fee in the form of two nickels, the first one of which is caught and held by a trap (not shown) in the five-cent slot 115 until the second nickel is deposited, whereupon both nickels pass down the nickel chute 115 to enter the coin-abeyance chamber.

When at least one coin (a quarter, a dime, or two nickels), has traversed a coin chute 115 to 117 to enter the coin-abeyance chamber referred to, it strikes the trigger end of the gravity-biased detect lever 121, causing that lever to rotate temporarily in a counterclockwise direction. The tip of the normally latched trip lever 122 is thus released, causing spring 123 to rotate lever 122 in a counterclockwise direction to its operated position. The lower arm of lever 122 thereupon forces spring member 127 to the right to engage spring 128 and bring it out of contact with spring 129. The windings of the polarized collect-refund electromagnet CR are thus connected between ground and the tip conductor T of line L, through contact springs 127 and 128. Also, shunt conductor 150 is disconnected at spring 129, thereby effectively including pulse springs 1 of the calling device CD and the winding of the coin-accept magnet CAM, each directly in series with substation loop. Magnet CAM now energizes to attract its armature 109, thereby moving member 111 to the right to cause portion 113 thereof to adapt the nickel chute 115 to effectively receive, and pass immediately to the coin-abeyance chamber, any nickels which may be deposited thereafter in the nickel slot 5. This nickel-accepting action, of magnet CAM, while not required for a local call, is useful when the originated call is a toll call, as will be explained hereinafter.

Having deposited the fee to cause the described operation of spring 127 to 129 to occur, the caller may now operate the calling device CD in the usual manner to transmit a succession of series of interruption impulses at its contacts 1, which contacts are now effective since conductor 150 has been opened at contact springs 128 and 129. On each operation of the calling device CD, its contacts 2 are closed to shunt the impedance elements of the loop to improve the dialing path, and its contacts 3 are opened to disconnect the receiver R for the usual click-prevention purposes. Magnet CAM, being one of the elements shunted at contacts 2 of CD, restores during each dialing operation, but reoperates at the end thereof.

If the call is to a local line and is answered, conversation may take place in the usual manner.

When the handswitch is subsequently replaced, contacts 1 of HS first disconnect the receiver R, and contacts 2 then open the substation loop, causing CAM to restore, and initiating release of the connection. Prior to complete release of the connection, conventional exchange apparatus (sometimes in the form termed a paystation repeater) operates to transfer the tip and ring conductors of the calling line from the usual battery-feed path to a source of 110-volt direct current of a polarity depending on whether the coin (or coins) held in abeynace at the paystation is to be collected or is to be refunded, according to whether the local call was successfully completed, or remained unanswered. Armature 124 of polarized magnet CT is moved in one direction by current of one polarity to collect, and is moved in the opposite direction by current of other polarity to refund, deposited coins. Movement of 124 in either direction from its normal position carries roller 126 into contact with lever 122 and with spring member 127, resulting in parts 121, 122 and 127 and 129 being reset and left in their illustrated normal condition when armature 124 restores.

*Toll-call operation*

When a toll call is originated from the illustrated paystation, a local-call fee is first deposited as previously described. In a typical manual system, when a toll connection is requested, the answering operator may cause the pre-payment deposit to be returned, by causing CR operation, and then extend the connection metallically to the toll board for further handling by the toll operator.

When a typical automatic switchboard is used, pre-payment deposit of the required local-call fee is followed by a calling device CD being operated in accordance with the listed number of the toll operator, whereby the connection is extended metallically to the toll board. The toll operator thereupon causes the pre-payment deposit to be returned by action at CR, by applying the usual high potential, of refund polarity, to the calling line.

In the calling paystation, the refund action of armature 124 of magnet CR causes the deposited coin or coins to be dropped into the refund opening 210 of Fig. 2. The lever and contact mechanism 121, 122, and 127 to 129 associated with CR is restored to its illustrated normal condition when the refund current and voltage condition is removed from the line. The coin-accept magnet CAM is thus again shunted at contact springs 128 and 129 to restore lever 111, thereby again conditioning the apparatus to withhold acceptance of a single deposited nickel.

After the desired toll connection has been established, and usually before conversation is permitted, the toll operator requests the paystation caller to deposit a coin, or coins, equal to the required fee. She preferably instructs him to first deposit a quarter or dime. The deposit of either such coin gives the operator the usual coin-tone signal through one of the transmitters CT, and it causes lever 121 to be operated as described to release lever 122. Springs 127 to 129 are thereby shifted again to their alternate condition. Coin-accep magnet CAM is thus again included in the direct-current loop to bring the coin-chute mechanism at 115 into condition to accept any nickel thereafter deposited therein.

As examples of the use of nickels for change-making purposes in paying for a toll call, a dime and a nickel may be deposited in succession in payment for a fifteen-cent toll call, and a quarter and a nickel may be deposited in succession in payment for a thirty-cent toll call. On the other hand, if the arrangement of the Hoyt et al. patent is employed at the nickel-chute mechanism of the paystation, a fifteen-cent toll call, for example, may be paid for by the deposit of three nickels, with the first being temporarily held, the second passing through and releasing the first one for effective passage. The passage of the first two nickels conditions the lever and contact-spring mechanism associtaed with CR to cause magnet CAM to operate and admit the third nickel immediately upon deposit.

When collection of the deposited coins is made, through the usual action of collect-refund magnet CR, the associated lever and contact-spring mechanism is again returned to its illustrated normal condition.

*Modification of Fig. 4*

Fig. 4 shows the circuit of Fig. 1 modified by including the normally closed contacts 400 in series with the shunting conductor 150, to the end that magnet CAM cannot be shunted over conductor 150 except when its armature 109 is restored, as when the handset is replaced to open the loop at contacts 2 of HS. Preferably, the polarity of the refund source of current and the connections to CR are so related to the connections between the conductors of line L and the line terminals of the paystation that the direction of current flow through the winding of CAM is the same during an application of high-voltage refund potential to L as during normal loop flow, whereby CAM remains operated during the normal operation of refunding the initial pre-payment deposit when a toll connection is requested. Under this condition, the nickel chute 115 remains cleared for the immediate acceptance of nickels when payment is to be made for the requested toll connection. The magnet CAM may be rendered slow-restoring, as by the indicated conducting sleeve beneath its winding, to avoid its unwanted restoration if momentarily deprived of current during the usual transfer between the refund connection and the normal loop connection.

This modified circuit arrangement of Fig. 4, while of substantial utility for short-haul and other toll calls which can be completed promptly, has no particular advantage over Fig. 1 for delayed-call connections, wherein the handset is replaced until the toll operator calls back, since CAM restores when contacts 1 of HS are opened upon handset replacement.

While I have described above the principles of my invention in connection with specific apparatus, it is to be clearly understood that this description is made only by way of example and not as a limitation to the scope of my invention, which is clearly applicable to analogous paystations which render vending or other services outside of the telephone communication field.

I claim:

1. In a paystation for rendering service requiring only a minimum fee as well as service requiring a greater fee, gauged coin chutes for receiving coins of respective denominations in payment of fees, the coin chutes including a high-value chute gauged to receive a coin having a value at least equal to the minimum fee, and including a low-value chute gauged to receive a coin having a value less than the minimum fee, barring means normally preventing passage through the low-value chute of a single deposited coin while permitting passage therethrough of a plurality of coins and freely permitting the passage of coins through the high-value chute, normally closed electrical contact means and means for opening it responsive either to the passage of a coin through the high-value chute or to the passage of a plurality of coins through the low-value chute, an electromagnet having a winding, means responsive to energization of the winding for disabling the barring means, an energizing path for the winding, a calling device having sending contacts for producing circuit interruptions necessary to the rendering of service by the paystation, the sending contacts being in the energizing path in series with the winding, circuit means normally establishing a shunt path for shunting energizing current from the sending contacts and winding, the normally closed electrical contact means being included in the shunt path to open it when the contact means is opened, whereby the shunt is removed from the sending contacts and the winding in the energizing path, the consequent energization of the winding causing the said disabling of the barring means.

2. In a paystation according to claim 1, the said contact means further comprising means for signalling that the said minimum fee has been deposited.

3. In a paystation according to claim 1, the said electromagnet having normally closed contact means for further opening the said shunt upon the said energization of the said winding.

References Cited in the file of this patent

UNITED STATES PATENTS

| | | |
|---|---|---|
| 2,509,477 | Carson et al. | May 30, 1950 |
| 2,670,830 | Hoyt | Mar. 2, 1954 |
| 2,673,243 | Lomax | Mar. 23, 1954 |
| 2,691,484 | Hoyt | Oct. 12, 1954 |
| 2,707,724 | Gallagher | May 3, 1955 |
| 2,804,502 | Iwema | Aug. 27, 1957 |